F. A. LYMAN.
Vapor-Burner.

No. 227,695. Patented May 18, 1880.

WITNESSES
INVENTOR
ATTORNEY

2 Sheets—Sheet 2.

F. A. LYMAN.
Vapor-Burner.

No. 227,695. Patented May 18, 1880.

WITNESSES

INVENTOR

UNITED STATES PATENT OFFICE.

FORDYCE A. LYMAN, OF CLEVELAND, OHIO.

VAPOR-BURNER.

SPECIFICATION forming part of Letters Patent No. 227,695, dated May 18, 1880.

Application filed February 27, 1880.

*To all whom it may concern:*

Be it known that I, FORDYCE A. LYMAN, of Cleveland, in the county of Cuyahoga and State of Ohio, have invented certain new and useful Improvements in Vapor-Burners; and I do hereby declare the following to be a full, clear, and exact description of the invention, such as will enable others skilled in the art to which it pertains to make and use it, reference being had to the accompanying drawings, which form part of this specification.

My invention relates to vapor-burners; and it consists in an improved burner so constructed as to supply a second commingling-chamber before the vapor is ignited for heating purposes; also, in an improved method of supplying the initial heat by which the gasoline is vaporized; also, in a removable deflector, by means of which the gasoline is conveyed from the supplemental jet-orifice to a drip-cup below; also, in a shield so arranged as to convey the heat generated in and about the vaporizing-chamber to a distance therefrom, so in rising said heat will pass outside of and not interfere with the steady burning of the jets above; also, in parts and combination of parts that will more fully hereinafter appear.

Figure 1:
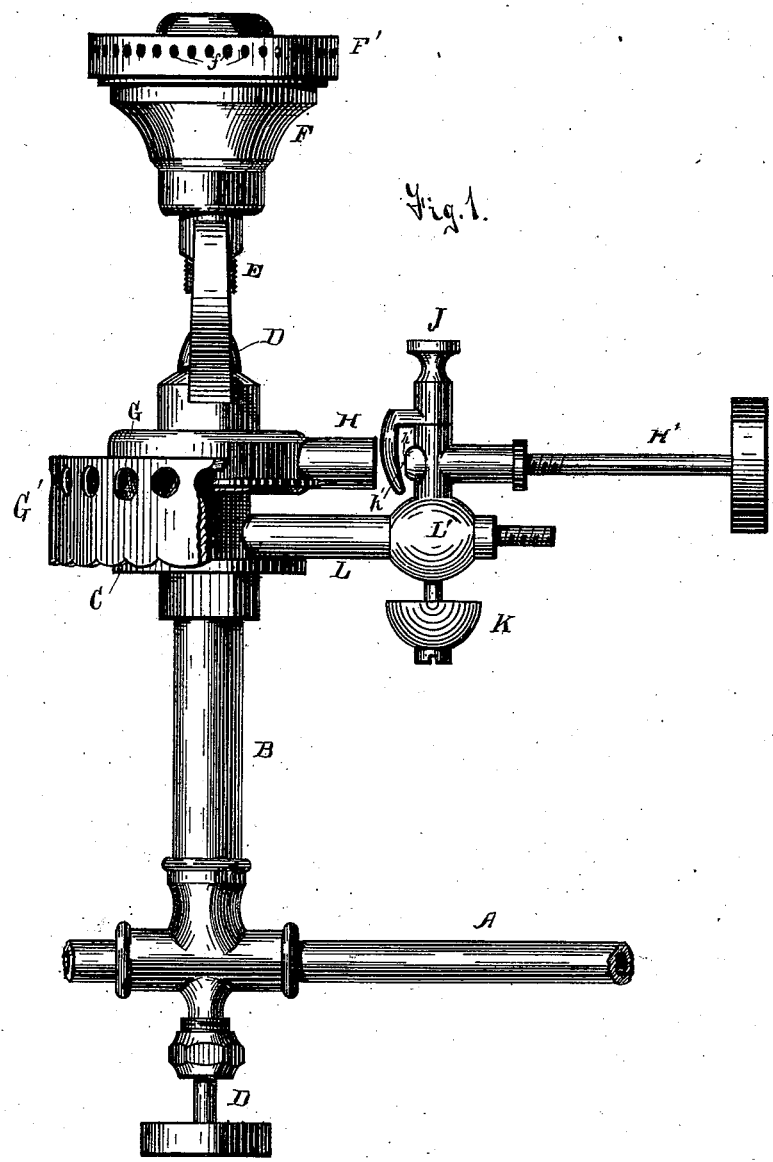
Figure 2:
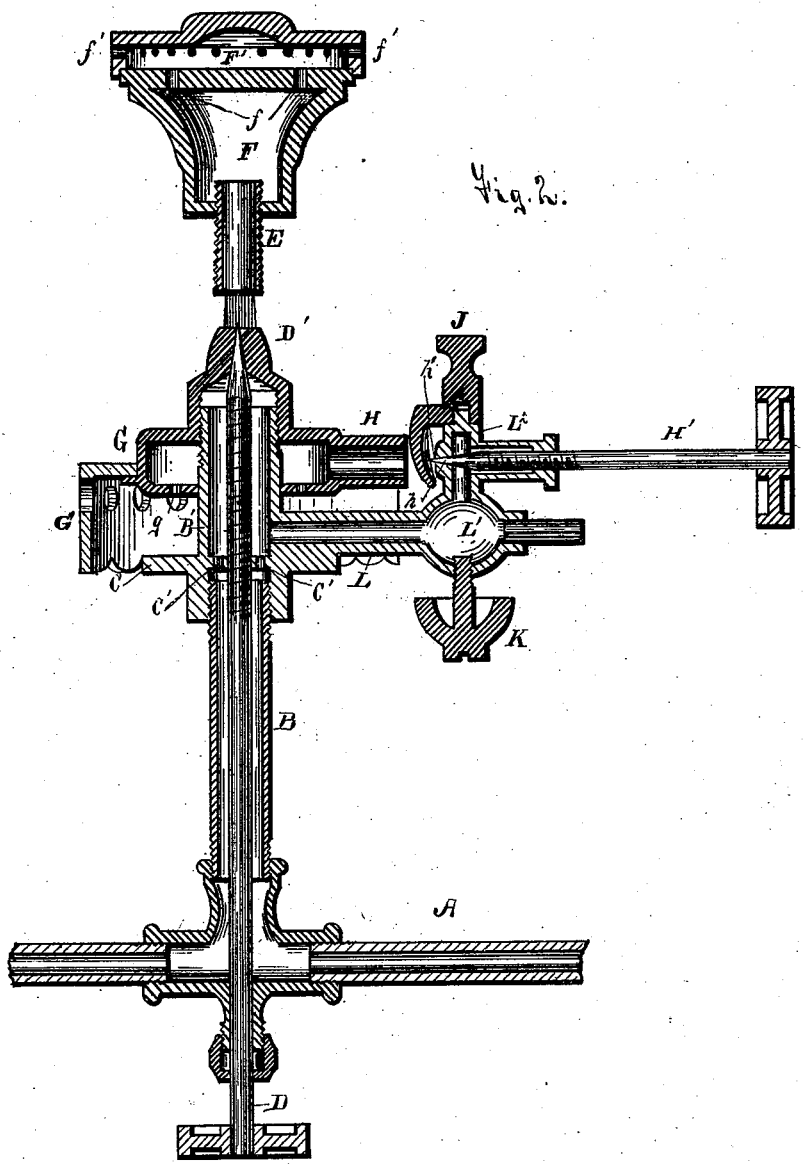

In the drawings, Figure 1 is a view, in elevation, of a burner constructed according to my invention, and Fig. 2 is a vertical sectional view of the same.

In the said drawings, A is any suitable pipe connecting the gasoline-supply reservoir with the burner. B is a tube adapted to contain the screw-shaft D, and at the same time to permit the free passage of gasoline from the supply-pipe A to the commingling-chamber B'. C is a heating-plate. G is the vaporizing-chamber, provided through its bottom with openings $g$ for the passage of vapor, which, being lighted, communicates heat to the plate C, and through it to the vaporizing-chamber B'. The bottom of the vaporizing-chamber B' is perforated to permit the passage of gasoline from tube B to the vaporizing-chamber.

Instead of permitting the free passage, as is usual in burners of this character, I find that in forcing the gasoline through small orifices in the manner shown it is more readily vaporized.

Upon the end of the screw-shaft D is a needle-point, the office of which is to open or close the vapor-jet D'.

E is a short tube suspended immediately over the vapor-jet D', through which the vapor passes to the commingling-chamber F of the burner. The vapor, in its passage from the valve D', carries with it through the short tube E air, with which it is commingled in the chamber F. From thence it passes into a supplemental commingling-chamber, F', through suitable orifices $f$. This commingling-chamber F' is covered with a suitable cap, perforated, preferably about its edge, with a suitable number of apertures, $f$, for the passage of the vapor, which by this time has been thoroughly commingled with the oxygen of the air, and is burned as it escapes through the orifices $f'$.

Upon one side of the commingling-chamber G is attached a short tube, H. The office of this tube H is to convey vapor, and with it air, to the commingling-chamber G.

Connecting with the vaporizing-chamber B' is the tube L, which permits free passage of gasoline from the supply-pipe A to the valve $h$. This short tube L, at a suitable distance from the pipe B, I prefer to enlarge, as shown at L'. This gives a sufficient body of metal to retain heat until heat is imparted to it through the plate C. Above this bulb L', and connecting with it, I attach a pipe to convey the gasoline to the valve $h$. This valve is operated by means of the screw-shaft H'.

J is a deflector pivoted upon the short pipe $L^2$, and adapted to be either turned in such a position as to cover the valve $h$ or turned to one side out of the way. The office of this deflector is to turn the gasoline as it is permitted to escape from the orifice $h'$ down into the drip cup or plate K, and is only used when the burner is first lighted.

Having thus described the construction of my device, its operation is as follows: These burners are adapted to be used singly or in series, each operated independently of the other. Gasoline is supplied through the pipe A. The valve D being closed, its outlet is only through the pipe L into the bulb L', and from thence into the short pipe $L^2$.

When it is desired to start the flame the screw-shaft H' is opened, the gasoline permitted to escape through the orifice $h$, when it will strike the deflector J and be turned into the drip-cup K. When a sufficient quantity has been permitted to escape the valve is closed and the gasoline in the drip cup or plate K is lighted. In a moment the gasoline in the bulb L' becomes sufficiently heated to vaporize, when the screw-shaft H' is again opened and the gasoline, in the shape of vapor, permitted to escape through the orifice h. The deflector J having been turned out of the way, the gas passes readily into the commingling-chamber G through the pipe H, taking with it a sufficient quantity of air.

In this chamber the gas mixes readily with the air admitted with it, and passes out through the openings g upon the under side of the commingling-chamber G, where it may be lighted. In a very short time the plate C becomes heated by the gas-jets now burning in the bottom of the commingling-chamber G, and heat is communicated through this plate C to the vaporizing-chamber B'. The valve D' may now be opened, when the vapor will pass, carrying with it a quantity of air through the short tube E into the first commingling-chamber F of the burner. From thence it passes through the orifices f into a second commingling-chamber, F', when it strikes the cap or cover of the chamber, and finally escapes through the openings f', where it may be lighted.

If it is desired at any time to shut off the heat-supply, the valve D' may be closed, leaving the valve h still open. The burner will be ready at any time subsequent to be lighted by simply opening the valve D'.

The supply of vapor through the orifice h can be regulated by the screw-shaft H'.

It may be found at times that the gasoline or vapor escaping through the valve D', by which the burner is supplied, is not thoroughly vaporized. Vaporization can be increased by increasing the volume permitted to escape through the valve h.

The shield G' (see Fig. 1) I consider a marked improvement over any device of this character of which I am aware. It simply consists of a plate adapted to fit on or about the commingling-chamber G, having its sides turned downward and perforated to permit of a ready escape of heat. Its object, as already stated, is to convey the heat arising from the plate C and about the vaporizing-chamber B' to a point sufficiently removed, so that as it escapes through the openings in the shield and rises it will pass outside of the flame of the burner above.

Another important feature of this invention is the second commingling-chamber F'. Heretofore a number of attempts have been made to prevent the roar incident to vapor-burners. The difficulty has been that the gas generated has not been thoroughly mixed with the oxygen of the air before it was burned, and consequently occasioned innumerable small explosions, which in the aggregate caused the continuous roaring. I find by experiment and use of this supplemental or second commingling-chamber F', and connecting therewith the feature of permitting the escape of the vapor in orifices at right angles to those through which it enters this second commingling-chamber, that this continuous roaring is almost entirely done away with.

I find also that I am enabled to vaporize the hydrocarbons of a higher degree than that accomplished by any other burner of which I am aware.

I have in this burner succeeded in using the ordinary coal-oil with a fire-test of 110°. This I think has never before been accomplished by any vapor-burner, and it is a step toward the use of burners of this character for cooking and heating purposes that will render them much more safe. I accomplish this by the use of my commingling-chamber G.

I think this is the first vapor-burner where a commingling-chamber has been used to produce the initial heat to supply the vapor for the burner. By its use I am enabled to vaporize oils of a higher degree. This is accomplished by the intense heat generated by the use of this commingling-chamber. I find it desirable, when the burner is used for this purpose, to enlarge the small openings g in the bottom of the commingling-chamber. By doing this the flame is confined to the interior of the commingling-chamber G, thereby creating an intense heat in and about the vaporizing-chamber B'.

What I claim is—

1. In a vapor-burner, the combination, with a combined air and vapor tube and a primary commingling-chamber into which said tube empties, of a secondary commingling-chamber and a partition between the two chambers, provided with orifices which connect them, substantially as set forth.

2. In a vapor-burner, the combination, with a combined air and vapor tube and a commingling-chamber into which the tube discharges, of a second commingling-chamber, located above the first, and a partition provided with orifices which connect the two chambers, the side wall of the second chamber being formed with burning-jets, located at right angles to said connecting-orifices, substantially as set forth.

3. The combination, with a vaporizing-chamber, of a laterally-projecting shield, which surrounds it and is adapted to prevent the heat generated about said chamber from rising in line with the burner and disturbing the flame thereof, substantially as set forth.

4. The combination, with a vaporizing-chamber, of a shield which surrounds it and has its upper portion provided with lateral openings, said shield projecting laterally out from the vaporizing-chamber and adapted to deflect the heat generated about the same, so that said heat may not rise in line with the burner and interfere with its flame, substantially as set forth.

5. The combination, with an upright gasoline-pipe provided with a lateral orifice and a drip-cup located below the pipe, of a guide or deflector adapted, when in use, to direct the gasoline escaping from said orifice into the drip-cup, and when not in use to be turned to one side out of line with said orifice, substantially as set forth.

6. The combination, with a vaporizing-pipe, of an air and vapor commingling chamber formed around it, and through which the pipe passes, said chamber being independent of the burner and provided with a perforated bottom, substantially as set forth.

In testimony whereof I have signed my name to this specification in the presence of two subscribing witnesses.

FORDYCE A. LYMAN.

Witnesses:
  JNO. CROWELL, Jr.,
  WILLARD FRACKER.